Jan. 17, 1928.
E. E. BALDWIN
MARINE CRAFT
Filed Oct. 12, 1926
1,656,411
3 Sheets-Sheet 1
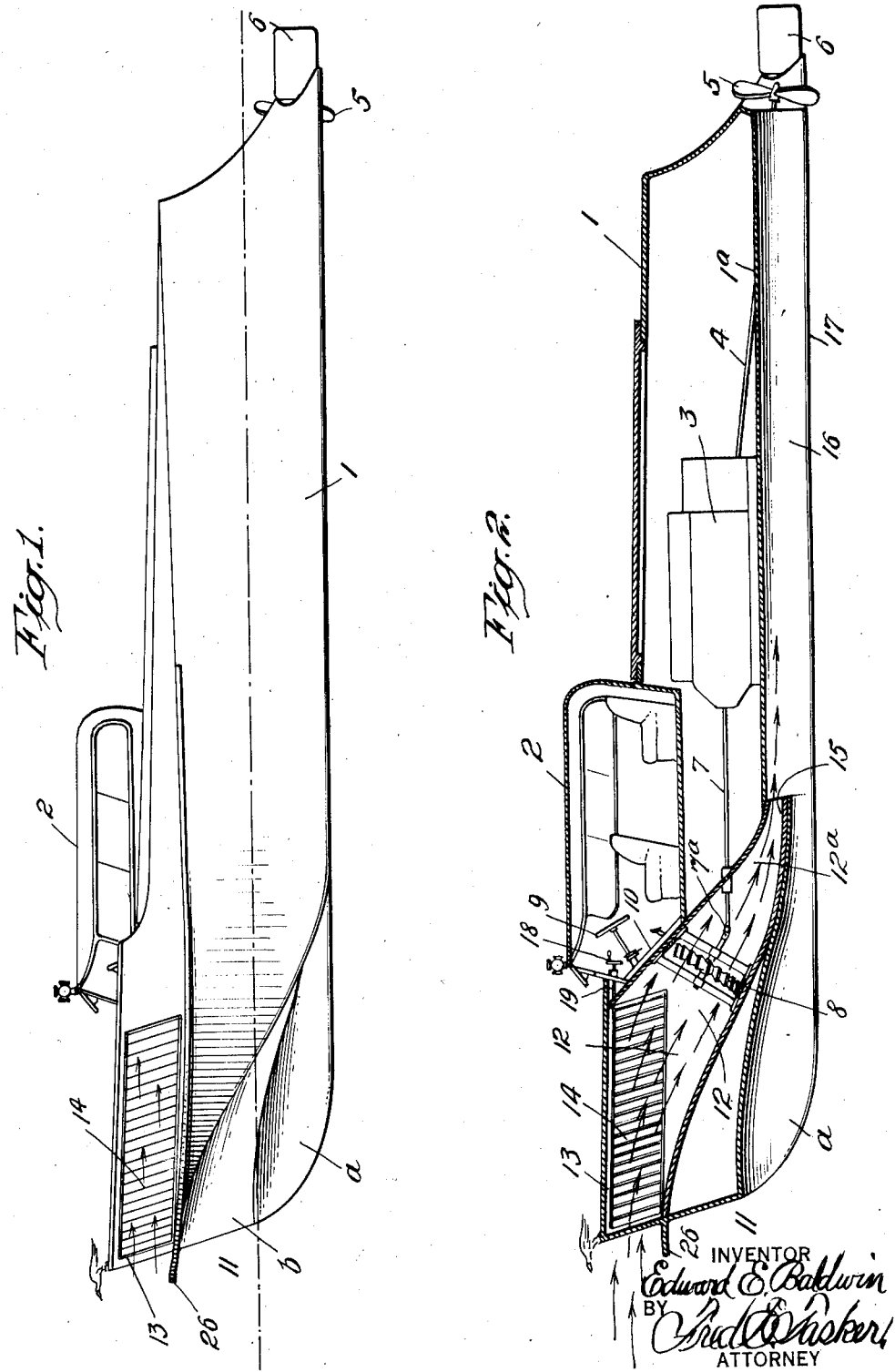

Jan. 17, 1928.

E. E. BALDWIN

MARINE CRAFT

Filed Oct. 12, 1926

INVENTOR
Edward E. Baldwin
BY
ATTORNEY

Jan. 17, 1928.
E. E. BALDWIN
MARINE CRAFT
Filed Oct. 12, 1926
1,656,411
3 Sheets-Sheet 3
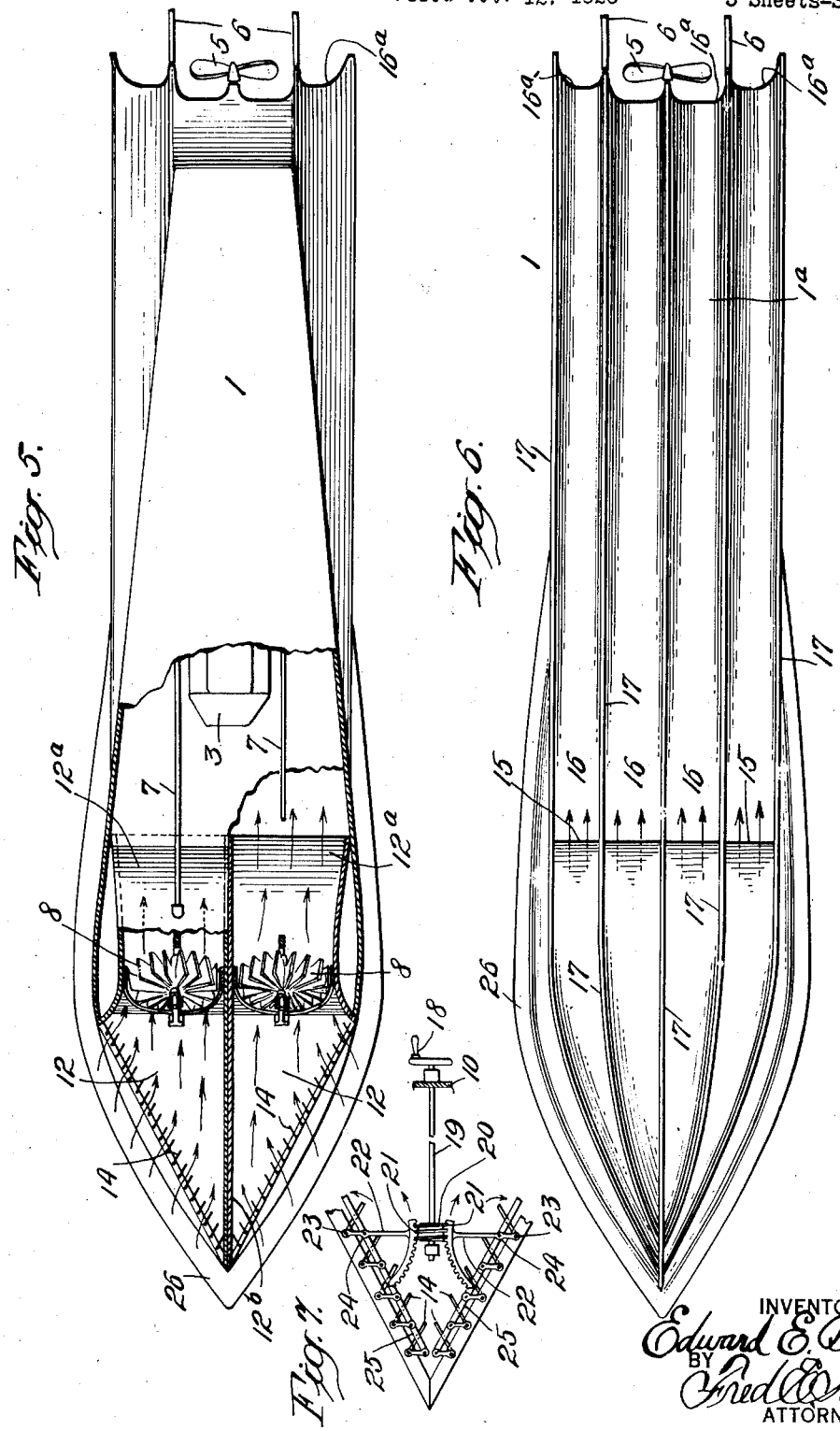

Patented Jan. 17, 1928.

1,656,411

UNITED STATES PATENT OFFICE.

EDWARD E. BALDWIN, OF NEW YORK, N. Y., ASSIGNOR OF ONE-HALF TO JOHN H. THOMAS, OF EAST ORANGE, NEW JERSEY.

MARINE CRAFT.

Application filed October 12, 1926. Serial No. 141,075.

My present invention relates to certain new and useful improvements in the hull construction of miscellaneous types and forms of marine craft, especially high speed motor boats, whereby numerous important advantages are secured, among which may be mentioned very high speed, stability in a sea way, elimination of spray, utilization of wind pressure, all while using a minimum of power and thus subserving economy of operation.

My invention is based on the novel and ingenious idea of utilizing and eliminating the wind pressure caused by the speed of the craft, and diverting its direction to the bottom of the hull, interposing a stratum or film of air between the bottom of the hull and the water, causing the hull to ride largely on this diverted wind pressure, thus reducing a large amount of the skin resistance of the hull in the water. The propeller under the stern of the hull, which gives the hull its forward push, should have much less slip to each revolution, as it is pushing against solid water, and the boat rides largely on the deflected wind pressure. By this means I insure greater speed with a minimum of motor power. The wind is taken up and deflected downward by means of fans, and caused to pass through an air chamber in the interior of the bow end of the hull. The inner air exit of this air chamber is in the form of a step outlet, the vertical side of which is open. The lower and water side of the step acts as a buffer to the water, deflecting it in such a manner that there is a gap where it must jump from one surface to another, when going at a medium speed, thereby causing a vacuum or suction space, a natural pocket, and adjacent to the vertical open side of the air exit step, into which the air enters.

As the water jumps from the lower and water side of the step air exit, the next natural surface for it to strike would be the bottom of the hull a distance back of the step toward the stern of the hull, the distance depending on the speed of the craft, but as air has been introduced into the vacuum caused by the stream of water jumping under the step air exit of the air chamber, the water strikes the air instead of the bottom of the hull, and the water carries the air with it in the form of sheets or bubbles between itself and the bottom of the hull, as it streams toward the stern of the hull, and between the keels, which prevent the air from escaping under the sides of the hull.

The channels at or near the step air exit are rectangular in form. This gives the channels more cubic inches of space between the keels at the point where the vacuum is caused by the water jumping under the lower and water side of the air exit step, thus acting not only as an air suction pocket, but also as an air reservoir, from which the water stream gets its supply of air to carry through the channels, which channels gradually change from rectangular at the step to semi-circular at the stern. This means that the compression of air increases as the water stream carries it from the air reservoir adjacent to the step air exit and in the vacuum of the air pocket. This also would tend to keep a continual supply of air under the hull.

The greater the speed of the craft, the larger this air reservoir becomes; also the greater the speed, the less skin resistance without riding the boat out of the water and destroying is equilibrium.

The air cushion to be used for this purpose is chiefly derived from the air or wind pressure generated by the speed of the boat against the air, and this wind pressure is largely eliminated and utilized to form the continuous air cushion between the hull and water, being properly directed in one or more lines or streams along the keel or keels to the stern where it flows out and it is controlled and aided in all of its movements. And the air pressure generated by the forward movement of the hull may be supplemented or increased by the agency of fans or any suitable pressure or vacuum apparatus located in the hull and driven as desired to develop pressure, this being particularly useful at the time of starting. And also I employ means to eliminate the spray by the manner of drawing the water under the hull and by the use of a spray guard so as to create a better and more stable and pleasant movement of the boat.

With these and numerous other objects, purposes and advantages in view, the invention relying primarily upon the substitution of air for a large part of the water surface on which the vessel rides may be described to consist essentially in the construction, arrangement, and combination of parts, substantially as will be hereinafter fully set forth and then defined in clauses of claim.

In the accompanying drawing illustrating my invention:

Figure 1 is a side elevation of my improved marine craft.

Figure 2 is a longitudinal central section of the same.

Figure 5 is a top plan view, in partial section.

Figure 6 is a bottom plan view.

Figure 7 is a detail view of one form of the shutter-operating mechanism.

Similar characters of reference designate like parts throughout all the figures of the drawing.

Figure 3:
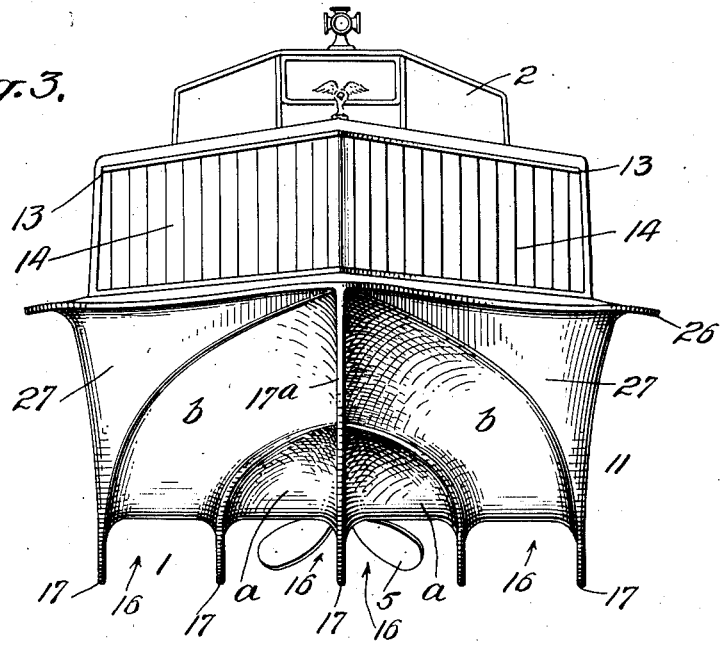
Figure 3 is a front end view.
Figure 4:
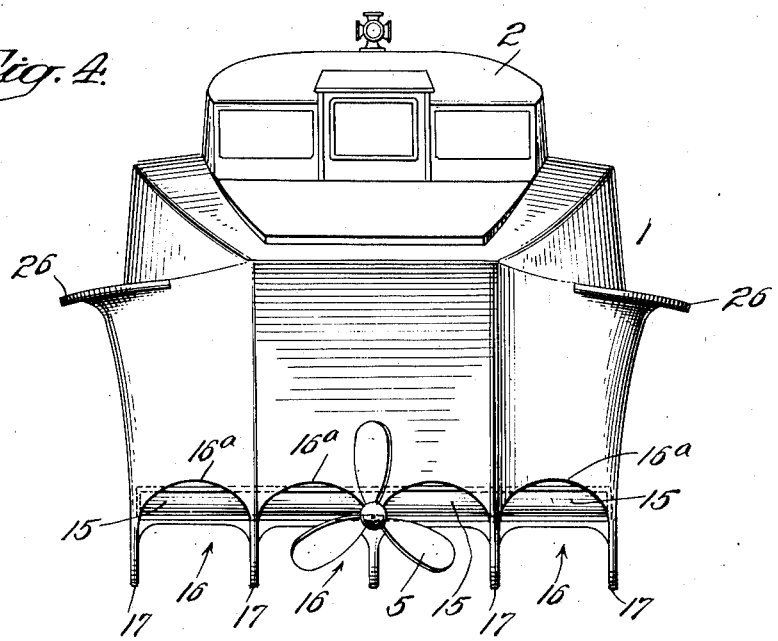
Figure 4 is a rear end view.

1 denotes the hull of any type of vessel, given as a specimen only, the shape of which hull may obviously vary within wide limits. The particular example of hull shown is that of a high speed motor boat.

2 denotes the cabin; 3 the engine; 4 a shaft driven by said engine and carrying a propeller 5; 6 the rudder or rudders; 7, 7, two shafts actuated by engine 3 to drive the fans or suction devices 8, 8. All these features may be arranged in connection with the hull in the most convenient and approved manner, and I do not wish to be restricted to any precise method. Also, a steering wheel 9 is adjacent to the instrument board 10 in cabin 2, which board may carry all the desired indicators, gauges, pointers, and other devices.

In the front portion of the bow 11 is an air chamber 12, having a central brace 12$^b$, which chamber is largest at the pointed front of the bow 11 where it is provided on opposite sides of the cut water with lateral openings or windows 13, 13 serving as ventilators or air inlets and equipped with shutters 14 or other means for opening and closing the windows 13. The inner and lower end 12$^a$ of the chamber 12 at the bottom of the hull is narrowed or contracted in size and formed with an air delivery mouth 15, (one or more of them) which is thin and wide and in the form of a step as it were and which is arranged to discharge air beneath the bottom of the boat and into the longitudinal channels 16 between the several parallel keels 17 with which the bottom 1$^a$ of my boat is preferably equipped. The air chamber 12 is therefore funnel shaped or conical, larger in front and smaller behind, and it receives the air as the boat moves speedily forward and compresses this air as it is forced into the smaller part of the chamber and then delivers it in the form of a stream or cushion between the bottom of the boat and the water beneath it and in which the boat floats, the open step or discharge outlet discharging the air into the bottom air channels 16 and out at the stern of the hull. Instead of a single air chamber there may be duplicate or multiple chambers having a single or several discharge mouths, and this chamber in any one of its forms can receive air pressure at both sides of the pointed bow through the shutter provided openings as aforesaid. The fans 8 are properly supported in bearings in the chamber 12 at a point where the diameter of the chamber is reduced to a size to easily hold the fans or where a partition is provided having openings therein to properly accommodate the fans so that in their operation they may be able to develop the necessary suction and air draft power to generate pressure, the shape, character, style, and method of support of these fans being susceptible of a very wide diversity. The fans are driven by the engine connections 7, 7, under suitable controls not shown, and the arrangement is such that the fans may be disconnected at 7$^a$ to allow said fans to run like a pinwheel with the wind pressure. Further, the fans 8 are placed at an angle as shown, so that the wind pressure coming horizontally through the opening in the forward end of the air chamber is deflected in a downward direction. This is to prevent the upper and inner surface of the air chamber from acting as a plane surface that, when hit by the air coming horizontally through the larger and forward opening of the air chamber, would tend to raise the bow of the hull out of the water. The fans are so arranged that all the air entering through the forward opening of the air chamber must go directly through the fans.

One form of shutters 14, 14 for the ventilating openings 13, 13, consists of slats or bars pivoted or otherwise carried at top and bottom and capable of being turned laterally so as to open or close the shutters and thus open or close the ventilating windows 13. For convenience I unite the shutters of both windows for joint operation as desired by a hand wheel 18, located near the instrument board in proximity to the steering wheel 9. One form of mechanism for jointly operating these shutters 14 is shown in Figure 7, where the hand crank wheel 18 is carried on a shaft 19 which it turns. Shaft 19 carries a worm 20 that engages the two gear segments 21, 21, which are provided with levers 22, 22, pivoted to the frame of the boat at 23, 23 and also pivoted at 24 to the long strips 25 which are attached to projections on the shutter slats. By the movement of these parts the shutters for both openings 13 may be opened or closed at the same time. The shutters are opened when speed is desired, and closed when the boat is not in use, or when the water is too rough for the size of the boat to prevent shipping water through the air chamber. When the shutters are opened the air, which would ordinarily be wind pressure acting against the front of the boat as a serious obstacle to its progress, flows into the air chamber to be put to work in the manner indicated, and the regulator fans 8 furnish the balance of power necessary to force the wind pressure through the open inner ends of the air chamber or chambers and into the air channels between the keels. A gauge at the board may indicate the air pressure in the air chamber, and the fans should be used to keep the pressure at a degree that is found to be best. The fans or other pressure or vacuum devices also insure a supply of air in the bottom air channels from the time the boat starts in motion, and thus the boat does not have to acquire a certain amount of speed before having the benefit of an air cushion underneath the hull.

The air chamber that receives air pressure generated by the movement of the craft or by artificial generators within the hull, may be of many forms, sizes, shapes, and designs, provided only that they develop the required pressure supply and distribute it under the bottom of the hull, forming one or many layers or streams, as far back as the stern where the air is finally discharged into the water. Any kind of chambers, passages, tubes, compartments or receptacles will fulfill the purpose. As the air is usually received in the larger front end of the funnel shaped or conical chamber and forced back into the smaller end the air is compressed, for the smaller end of the air chamber acts as a compression unit, which terminates in the open step, outlet, or nozzle entering the bottom channels; so that the air entering the large end of the chamber is driven by its compression through the open step or outlet into the bottom channels.

The channels 16 are formed between the plural keels 17. Said channels are at different elevations. The outside channels act as stabilizers. These channels 16 run under the step opening 15 and extend into the bow 11, since the keels 17, see Figure 6, run under the bow, and the two inner or central channels terminate in the front concave or spoon-like recesses $a$, $a$, on the front bow 11 beneath air chamber 12, see Figure 3, while the two outer channels 16, in a case where there are four channels, terminate in the front concave or spoon-like recesses $b$, $b$ which curve upwardly from the outer channel 16, 16 over the concavities $a$, $a$, to the pointed center 17$^a$, rising from the center keel 17. There may be much variation and change of shape in these recesses $a$ and $b$, but they are the same in number as the channels and they are designed to keep the water from spreading from side to side and convey it under the boat where it acts effectively to prevent the air delivered through the outlet 15 from escaping but acts to more surely direct it into the bottom channels 16 and through the same. The two outer channels 16 I term stabilizer channels as they help to stabilize the movement of the boat. The ends of all the channels adjoining the step delivery outlets 15 are formed with the bottom of the boat flat or straight across at that point so that the water as it is deflected downward on the lower and water side of the step must jump the gap created by the open step. This forms a vacuum or an open space which tends to pull the air in the pocket formed by the water as it jumps from the lower and water side of the step; but as the air has been introduced into this open space, the water instead of hitting the hull of the boat a hammer blow somewhere on the bottom of the hull between the keels at some point between the step outlet and the stern, merely acts as a surface to hold in the air until it reaches the stern and the end of the channels; and further, so that the discharge of air from opening 15 will be directly under the flat bottom of the boat; but these channels as they approach their rear ends 16$^a$ in the stern are preferably transversely curved horizontally, as shown in Figures 5 and 6. Such a shape for the channels 16 secures the best result in handling the air cushions as described. The open bottom sides of the channels have the air sealed in longitudinal compartments as it were by the upward pressure of the water.

The spray guard 26 is a flat or slightly curved lateral horizontal flange placed around the bow of the hull and extending out at a right angle to the sides of the hull, and running backward from the bow on each side for any desired distance, perhaps half the length of the boat or more, it being in such a position that it will turn any flying spray back into the water. The hull pointed bow has its outside surfaces quite flat at the front cut water, as at the forward end 17$^a$ of the vertically rising portion of the central keel or what may be considered an extension of the latter keel on the front of the bow; and from this cut water 17$^a$ the bow on each side has a half round or convex under side 27 sloping towards the open air discharge step 15 or directly into the air channel 16 at the bottom of the hull. Or to otherwise express it, the ridges formed by the joining of the concave recesses $a$, $a$, and $b$, $b$, see Figure 3, extending from the cut water to the bottom of the hull gradually increase in width until at such step or discharge 15 they become the keels which serve as the sides of the air channels, the keels being in a multiple arrangement. The convex front surfaces 27 below spray guard 26 at the front of the bow blend in to the sides and become the sides of the hull while the keels naturally develop from the continued curvature of the sides. Obviously the detailed description of the exact curvatures of all of these parts may be amplified if necessary but enough has been said to explain the general form so far as it is necessary to understand it to comprehend the complete working of the invention.

While I have very fully described certain successful embodiments of all of the main features of my invention I wish it distinctly understood that what I have given is only a specimen or example of the many forms which the invention might assume, and I do not wish to be restricted to the precise form or example herein offered, because the configuration may be greatly modified without a departure from the invention.

Having thus described my invention what I claim as new and desire to secure by Letters Patent, is:

1. In a marine craft, a hull provided at the front with a cut water and concave outer recesses at opposite sides of the cut water, said hull having also a plurality of keels between which are channels that communicate with said concavities, of means within the hull for receiving air pressure as the craft moves forward, said means having an open step air outlet near the bottom of the hull and adjoining the channels, through which outlet the air pressure is delivered into the channels and is sealed therein in longitudinal streams from the front of the bow to the stern.

2. In a device of the class described, a hull having a plurality of keels between which are channels, and having at the bow a central cut water on opposite sides of which spread as they recede from the cut water concave surfaces graduating and spiraling from the vertical flat surface of the cut water into the horizontal and flattened surfaces of the lower and water side of the open step air exit of the air chamber, the ridges caused by the joining of concave surfaces together being gradually allowed to become larger as they recede from the vertical cut water and become the keels that divide the bottom of the hull into channels, said concave surfaces being like in number to the channels on the bottom of the hull, and the action being to turn the water with a spiral motion causing it to be turned in a downward direction until the water is caught between the keels and flattened out on the smooth under surface of the open air step, a funnel-shaped chamber in the hull receiving air pressure through bow openings and formed with a lower inner open step outlet means below the bottom of the hull to deliver air between the keels.

3. In a marine craft, a hull having a cut water at the front and a plurality of recesses at opposite sides of the cut water, said hull having also a plurality of keels between which are channels that communicate with said recesses, the front of the hull having the ridges formed by the walls of the recesses extending from the cut water to the bottom of the hull to gradually increase in depth as they become keels and provide channels for keeping the water in place throughout a part of the length of the craft and for receiving air throughout the remainder of the length of the craft, and an air chamber within the bow receiving air through a front opening and provided with a funnel outlet a short distance from the front of the bow through which outlet compressed air is delivered into the channels between the keels.

4. In a marine craft, a hull having a plurality of keels with channels between them, said channels being rectangular throughout part of their length and being concave throughout the remainder towards the stern, said hull having an inner air chamber of funnel shape receiving air through an opening in the front of the bow and delivering it from the smaller inner outlet end into the channels below the hull.

5. In a marine craft, the combination with the hull having external front recesses in the bow, the edges of which recesses extend downwardly under the hull in deepening lines until they assume the form of keels with channels between them, said recesses having the function of keeping the water from spreading from side to side and conveying it under the boat where it acts as a water seal at the air outlet, and means within the hull for collecting air pressure through an opening in the front of the bow and then compressing it into a step outlet located in the bottom of the craft a short distance from the bow and near the keels so that the compressed air may form layers in the channels between the keels and serve to lubricate the movement of the craft over the water.

6. In a marine craft, a hull having a bow provided at the front with an outer cut water and contiguous concave recesses at opposite sides of the cut water, said hull having longitudinal channels on the bottom, and said bow containing an air chamber receiving air pressure through front openings on opposite sides of the cut water as the craft moves forward, the rear part of said chamber being funnel shaped and extending downwardly to the bottom of the hull where it is provided with an open step air outlet which delivers the compressed air into the channels to provide cushions on which the craft rides, in combination with angularly-set fans having casings surrounding them and placed between the outer larger portion of the chamber and the inner funnel-shaped portion so as to act to deflect the direction of the incoming air pressure from the horizontal line of its entrance to a downward direction to conform with the funnel shape of the air chamber, thus preventing the air from using the upper and inner side of the air chamber as a plane which would tend to raise the bow out of the water.

7. In a marine craft a hull provided at the front with a cut water and concave outer recesses at opposite sides of the cut water, said hull having also a plurality of keels between which are channels that communicate with said concavities, in combination with means within the hull for receiving air pressure as the craft moves forward, said means having an open step air outlet near the bottom of the hull and adjoining the channels, through which outlet the air pressure is delivered into the channels and is sealed therein in longitudinal streams from the front of the bow to the stern, and angularly-set fans in the path of the air pressure entering the air-receiving means in the hull to deflect the direction of the incoming air pressure from the horizontal line of its entrance to a downward direction so as to prevent the air from using the inside of the hull as a plane which would tend to raise the bow out of the water.

8. In a marine craft, a hull having a bow provided at the front with an outer central cut water and contiguous concave recesses at opposite sides of the cut water, said hull having also a plurality of keels between which are channels that communicate with said concavities, and said bow containing duplicate air chambers receiving air pressure through front openings on opposite sides of the cut water as the craft moves forward, the rear part of each chamber being funnel shaped and extending downwardly to the bottom of the hull where it is provided with an open step air outlet which delivers the compressed air into the channels to provide cushions on which the craft rides, in combination with angularly-set fans in each chamber having casings surrounding them and placed between the outer larger portion of the chamber containing it and the inner funnel shaped portion so as to act to deflect the direction of the incoming air pressure from the horizontal line of its entrance to a downward direction to conform with the funnel shape of the air chamber, thus preventing the inside wall of the air chamber from acting as a plane to tend to lift the bow out of the water.

9. In a marine craft, a hull having longitudinal channels on the bottom, and having also a bow containing at the front end an inner air chamber receiving air pressure through an opening at the extreme front end as the craft moves forward, the rear part of said chamber being funnel shaped and extending downwardly to the bottom of the hull where it is provided with an open step air outlet which delivers the compressed air into the channels to provide air cushions for the craft, in combination with angularly set fans placed between the outer larger portion of the chamber and the inner funnel-shaped portion so as to deflect the horizontally-entering air to a downward direction so as to prevent the upper and inner side of the air chamber from acting as a plane to tend to raise the bow from the water.

10. In a device of the class described, a hull having a plurality of keels between which are channels, and having at the bow a central cut water on opposite sides of which spread as they recede from the cut water concave surfaces graduating and spiraling from the vertical flat surface of the cut water into the horizontal and flattened surfaces of the lower and water side of the open step air exit of the air chamber, the ridges caused by the joining of concave surfaces together being gradually allowed to become larger as they recede from the vertical cut water and become the keels that divide the bottom of the hull into channels, said concave surfaces being like in number to the channels on the bottom of the hull, and the action being to turn the water with a spiral motion causing it to be turned in a downward direction until the water is caught between the keels and flattened out on the smooth under surface of the open air step, a funnel-shaped chamber in the hull receiving air pressure through bow openings and formed with a lower inner open step outlet means below the bottom of the hull to deliver air between the keels, in combination with angularly-set fans having casings surrounding them and placed between the outer larger portion of the chamber and the inner funnel-shaped portion so as to act to deflect the direction of the incoming air pressure from the horizontal line of its entrance to a downward direction to conform with the funnel shape of the air chamber, thus preventing the air from using the upper and inner side of the air chamber as a plane which would tend to raise the bow out of the water.

11. In a marine craft, a hull provided with external channels on the bottom, and having a bow containing an air chamber that receives air pressure at the extreme front end through a front opening as the craft moves forward, means for compressing and changing the direction of the flow of the air in the chamber consisting of angularly set fans for deflecting the direction of the air pressure from the horizontal line of its entrance to a downward direction to conform with the shape of the air chamber, thus preventing the air from using the upper and inner side of the air chamber as a plane which would tend to raise the bow out of the water, and open step air outlet means on the lower end of the air chamber for the compressed air which is driven or sucked into the vacuum or air pocket created by the action of the water as it slides under the lower and water side of the said open step air outlet, thereby allowing the air to enter said bottom channels in cushioning layers between the bottom of the craft and the water from the forward end of the craft to the stern.

12. In a marine craft, a hull having a plurality of keels with channels between them, and having also a bow provided with an inner air chamber at the extreme front, said chamber having an outer larger portion which receives the air directly and an inner funnel-shaped portion extending down to the bottom of the boat where it is provided with a contracted open step air outlet which delivers compressed air into the channels between the keels so that layers of air may pass to the stern between the bottom of the craft and the water beneath, and angularly set fans between the large outer and the conical inner portions of the air chamber which catch the horizontally-incoming air and change its direction by deflecting it downwardly so it will not act against the inner side of the air chamber to lift the craft from the water.

13. In a marine craft, a hull having channels on the bottom and having a bow containing a pair of air chambers on both sides receiving air pressure through front openings as the craft moves forward and having conical inner portions, means for deflecting the direction of said air pressure from the horizontal line of its entrance to a downward direction to conform with the conical shape of the air chamber, thus preventing the air from using the upper and inner sides of the air chambers as a plane which would tend to raise the bow out of the water, said mechanism consisting of fans and surrounding casings placed at an angle to the downward direction of the air chamber, and open step air outlet means at the ends of the air chambers for the air so compressed which is driven into the aforesaid channels to form cushions on which the craft rides.

In testimony whereof I hereunto affix my signature.

EDWARD E. BALDWIN.